United States Patent Office 3,317,469
Patented May 2, 1967

3,317,469
REACTION PRODUCT OF A GLYCIDYL POLYETHER AND DIAMINOMETHYL-TRICYCLODECANE
Hans Feichtinger, Dinslaken, and Heinz Noeske, Oberhausen-Sterkrade, Germany, assignors to Ruhrchemie Aktiengesellschaft, a corporation of Germany
No Drawing. Filed Dec. 8, 1964, Ser. No. 416,893
Claims priority, application Germany, Dec. 11, 1963, R 36,770
2 Claims. (Cl. 260—47)

This invention relates to novel cross-linking agents for organic compounds containing oxirane

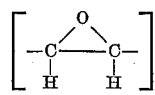

groups and methods for preparing such agents. More specifically, this invention relates to basic cycloaliphatic amines useful as hardening agents for organic oxirane compounds such as glycidyl polyethers.

Many basic organic compounds are known in the art, which can be used to harden glycidyl polyethers and other oxirane compounds. For example, aliphatic polyamines and cycloaliphatic polyamines having amino-groups linked directly to the cycloaliphatic nucleus are employed as basic hardening agents. These cycloaliphatic polyamines are generally prepared by nitration of an appropriate aromatic compound followed by hydrogenation of the nitration products.

Glycidyl polyether resins obtained by hardening glycidyl polyethers with polyamines or cycloaliphatic polyamines, although useful, have certain disadvantages. For example, resins prepared in such a manner, when compared to those obtained with dicarboxylic acids or anhydride curing agents, such as phthalic or maleic acids or anhydrides, are not as heat-stable, have lower ball indentation resistance and lower tensile and flexural strengths.

It is therefore an object of this invention to provide basic amine hardening agents or cross-linking agents, which will react with organic oxirane compounds such as glycidyl polyethers to form a resinous compound having physical properties equal or superior to those of epoxy resins obtained with organic acid hardening agents.

These and other objects of the invention are achieved by providing a basic hardening agent for organic oxirane compounds such as glycidyl polyethers comprising a cycloaliphatic amine of the formula:

$$H_2N—C_nH_{2n}—A—C_mH_{2m}—NH_2$$

wherein A is either a mono- or polycyclic cycloaliphatic hydrocarbon residue, and $m$ and $n$ are integral numbers, preferably in the range from 1 to 5.

The hardening agents of this invention are thus characterized by the two amino-groups connected to the cycloaliphatic ring or ring-system, respectively, across an aliphatic hydrocarbon residue, respectively.

Di-aminomethyl-tricyclodecane is an example of a hardening agent especially well suited for use as a basic hardening agent according to this invention.

At least 50 percent by weight of the hardening agents of this invention are also used in combination with various commercially available hardening agents well known in the art, such as aliphatic, aromatic and cycloaliphatic amines.

A preferred process for the preparation of the hardening agents of this invention comprises catalytically hydroformylating cyclic olefins to produce hydroformylation products which are subsequently aminated. For example, di-olefins, such as vinylcyclohexene, divinylcyclohexane, bicyclo (2.2.1) - hepta-2.5-diene, dicyclopentadiene, dipentene, and the like, or mixtures thereof, are reacted with carbon monoxide and hydrogen, according to the teachings of German Patent 928,645. The reaction products thus obtained are then treated with ammonia and hydrogen at elevated pressure, according to the teachings of German Patent 956,754. Di-amino-methyl-tricyclodecane is thus obtained by hydroformylation of dicyclopentadiene with water-gas to produce a hydroformylation product which is subsequently reduced and aminated.

The di-amines of this invention are clear, colorless, mobile liquids of weak odor.

The hardening agents of this invention are suitable for cross-linking or hardening epoxy compounds well known in the art prepared either by the oxidation of unsaturated organic compound or the condensation of epichlorohydrin and hydroxy compounds, such as bis-phenol A or bis-phenol F. More specifically, these hardening agents are well suited for curing, hardening or cross-linking commercially available glycidyl polyethers. They are also advantageously mixed with oxirane or epoxy compounds in substantially stoichiometric amounts; however, amounts in excess or less than the stoichiometric quantity required for complete reaction of the epoxy compound and hardener may also be used.

The method of hardening is conducted in accord with processes well known in the art.

The resins obtained, according to the invention, have superior heat-stability, flexural strength and impact strength as compared to resins hardened with conventional aliphatic or cycloaliphatic amines.

The resins obtained with the hardening agents of the invention can be used for the preparation of bonding agents, such as laminating adhesives or casting resins, plastic mortar, tool- and die-manufacturing applications, floor-coverings, electro-technical equipment and encapsulation compounds. Mixtures of the amines of this invention and the above-mentioned oxirane compounds may also be used in combination with thermoplastic or thermosetting resins by processes well known in the art. The oxirane compounds may be admixed with thermoplastic or thermo-setting resins prior to adding the novel hardening agent of this invention, or prior to complete hardening of the mixture.

The following non-limiting examples are given as certain preferred embodiments of the invention and are not to be construed as narrowing the novel and inventive amine, hardener, composition and resins of the applicants.

Example I

A commercially available glycidyl polyether sold under the trade name "Shell 828" having an epoxy equivalent weight of 191, is hardened with a stoichiometric amount of di-amino-methyl-tricyclodecane. The mixture is intimately mixed and cast in an iron mold 130 x 130 x 18 mm. and allowed to age for 24 hours at ambient temperature. The aged mixture is subsequently heated for 2 hours at 100° C.

Example II

The glycidyl polyether of Example I is mixed with stoichiometric amounts of a commercially available cycloaliphatic diamine hardener designated "Laromin C 252," after which castings are prepared in substantially the same manner as described in Example I.

Example III

The glycidyl polyether of Example I is again utilized for the preparation of a casting, however, is mixed with stoichiometric amounts of phthalic acid anhydride and hardened for 6 hours at 160° C. in a mold having the dimensions 130 x 130 x 18 mm. Identical test strips are cut from the castings obtained in Examples I, II and III, and the various physical properties of each are determined, the results of which are listed in the following table, Table I:

TABLE I

| Physical Properties | Test method | Example I<br>Di-aminomethyl-tricyclo-decane | Example II<br>Commercially available cycloaliphatic diamine | Example III<br>Phthalic acid anhydride |
|---|---|---|---|---|
| Tensile strength (kp./cm.$^2$) | DIN 53,455 | 765 | 709 | 735 |
| Elongation (percent) | DIN 53,455 | 13 | 11 | 11 |
| Flexural strength (kp./cm.$^2$) | DIN 53,452 | 1,325 | 1,180 | 1,390 |
| Deflection (mm.) | DIN 53,452 | 15 | 15 | 12 |
| Impact strength (kp. cm./cm.$^2$) | DIN 53,453 | 80 | 34 | 12 |
| Ball indentation after 10 and 60 sec. (kp. cm.) | DIN 53,456 | 1,168/1,127 | 1,125/1,109 | 1,324/1,279 |
| Heat resistance (Martens temp.) (° C.) | DIN 53,462 | 104 | 67 | 83 |

The test values given in Table I are determined according to DIN standards, i.e., "Deutscher Verband der Materialprüfungen der Technik." The Martens temperature in Table I is further defined in the Plastics Technical Dictionary, vol. 2: German-English, C. Hauser Verlag, Munich 1959, page 204.

The above examples illustrate that the hardening agents of the invention can be used to produce resins that have extraordinarily improved heat-resistance and impact strength. The flexural strength of the test specimens prepared according to Example I, utilizing hardening agents of this invention, corresponds approximately to that of the test specimen of Example III, wherein a glycidyl polyether is hardened with phthalic acid anhydride. The flexural strength and temperature-resistance of the resin of Example I, however, is far superior to that of the glycidyl polyether resin hardened with a commercially available cycloaliphatic diamine illustrated by Example II.

Thus, cycloaliphatic amines have been disclosed and described, which are used to harden oxirane compounds for the production of resins having superior tensile strength, flexural strength, elongation, impact strength, ball indentation and heat-resistance, as compared to prior art catalysts or hardening agents comprising commercially available cycloaliphatic diamines. The resins obtained with the hardener of this invention also have physical properties comparable to those obtained with organic acids or anhydrides.

Although the invention has been described with reference to certain preferred embodiments, it is not the intention of the applicants to be limited thereby, and certain obvious modifications of the novel cycloaliphatic diamine hardening agents and method of using them and compositions prepared therefrom are intended to be included within the broad scope of the invention, as embodied in the following claims.

What is claimed is:
1. Process for preparing glycidyl polyether resins which comprises reacting a glycidyl polyether with diaminomethyl-tricyclodecane.
2. A composition of matter comprising the reaction product of a glycidyl polyether with di-aminomethyl tricyclodecane.

References Cited by the Examiner

UNITED STATES PATENTS

| 2,795,612 | 6/1957 | Luduena | 260—563 |
| 2,817,644 | 12/1957 | Shokal et al. | 260—47 |
| 2,850,532 | 9/1958 | Simon | 260—563 |
| 2,989,502 | 6/1961 | Prescott et al. | 260—47 |

FOREIGN PATENTS

| 933,729 | 8/1963 | Great Britain. |
| 928,645 | 6/1955 | Germany. |
| 956,754 | 1/1957 | Germany. |

WILLIAM H. SHORT, *Primary Examiner.*

T. D. KERWIN, *Assistant Examiner.*